Figure 1:
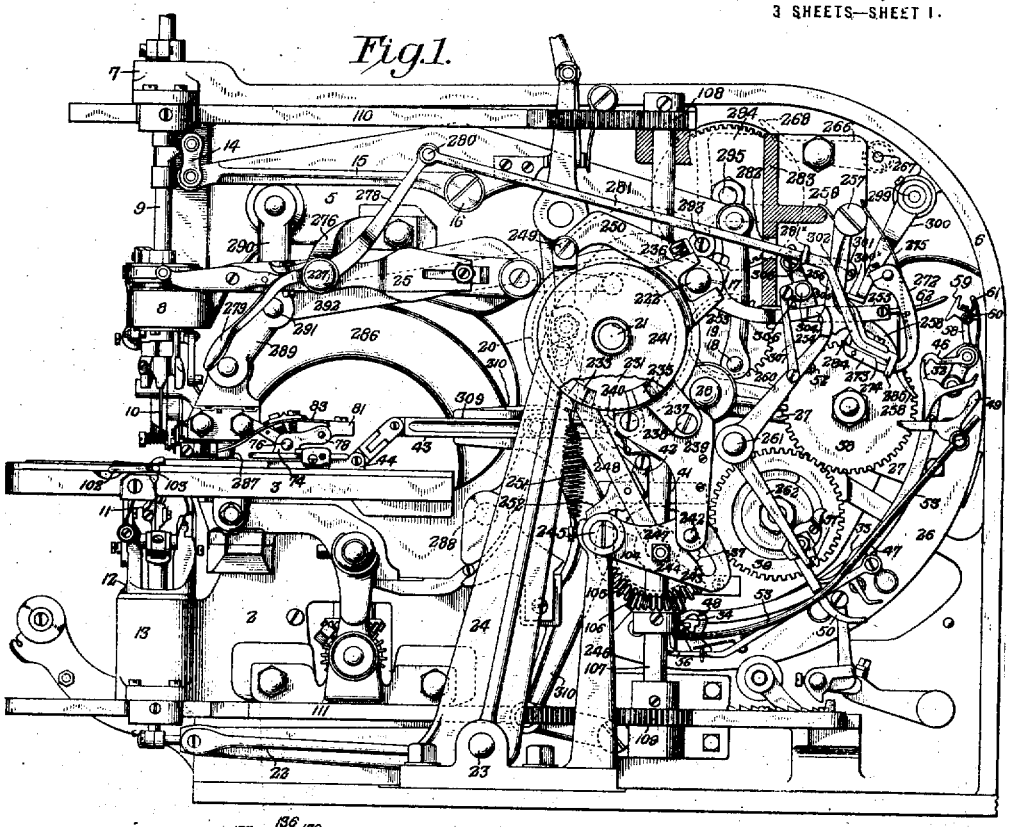

J. G. GREENE & L. F. A. BÜCHNER, (DECEASED.)

BUTTONHOLE SEWING MACHINE.

APPLICATION FILED AUG. 3, 1918.

Reissued Mar. 11, 1919.

14,608.

3 SHEETS—SHEET 1.

WITNESSES

J. H. Crawford

John T. Heinz

INVENTOR

James G. Greene, and,
Louis F. A. Büchner, dec'd.
The Singer Manufacturing Co.
Assignee.

BY Henry J. Miller

ATTORNEY

THE NORRIS PETERS CO., PHOTO-LITHO., WASHINGTON, D. C.

J. G. GREENE & L. F. A. BÜCHNER, (DECEASED.)

BUTTONHOLE SEWING MACHINE.

APPLICATION FILED AUG. 3, 1918.

Reissued Mar. 11, 1919.

14,608.

3 SHEETS—SHEET 2.

WITNESSES

J. H. Crawford.

John P. Heinz.

INVENTOR

James G. Greene, and,

Louis F. A. Büchner, dec'd.

The Singer Manufacturing Co.

Assignee.

BY Henry Miller

ATTORNEY

THE NORRIS PETERS CO., PHOTO-LITHO., WASHINGTON, D. C.

J. G. GREENE & L. F. A. BÜCHNER, (DECEASED.)

BUTTONHOLE SEWING MACHINE.

APPLICATION FILED AUG. 3, 1918.

Reissued Mar. 11, 1919. 14,608.

3 SHEETS—SHEET 3.

WITNESSES

J. H. Crawford

John F. Hines

INVENTOR

James G. Greene, and

Louis F. A. Büchner, dec'd.

The Singer Manufacturing Co.

Assignee.

BY Henry J. Miller

ATTORNEY

UNITED STATES PATENT OFFICE.

JAMES G. GREENE, OF ELIZABETH, AND LOUIS F. A. BÜCHNER, DECEASED, LATE OF ELIZABETH, NEW JERSEY, ASSIGNORS TO THE SINGER MANUFACTURING COMPANY, A CORPORATION OF NEW JERSEY.

BUTTONHOLE-SEWING MACHINE.

14,608. Specification of Reissued Letters Patent. Reissued Mar. 11, 1919.

Original No. 1,208,950, dated December 19, 1916, Serial No. 684,125, filed March 16, 1912. Application for reissue filed August 3, 1918. Serial No. 248,214.

*To all whom it may concern:*

Be it known that JAMES G. GREENE, a citizen of the United States, residing at Elizabeth, in the county of Union and State of New Jersey, and LOUIS F. A. BÜCHNER, deceased, late a citizen of the United States, residing at Elizabeth, in the county and State aforesaid, did invent certain new and useful Improvements in Buttonhole-Sewing Machines, of which the following is a specification, reference being had therein to the accompanying drawings.

This invention relates to an improvement in buttonhole stitching machines, and is directed particularly to novel features of the work-holder and means for operating the same. It has for one of its objects to provide automatically acting means whereby the work-clamping members may be successively closed upon the work and spread for a stitching operation and thereafter opened to release the work, and to provide clamp-operating means acting independently of the actuating means for the stitch-forming and cutting mechanisms, in order that the timing of the several groups of mechanism may be arranged each independently of the others so as to reduce to a minimum the time required in performing a complete cycle of the entire machine. It has for a further object to provide a simple and effective construction for the work-holder whereby the actuation of a single element thereof will accomplish the closing and opening of the clamping jaws and the spreading and drawing together of the separable pairs thereof.

In its preferred embodiment, the machine is constructed with rotary stitch-forming mechanism and work-feeding mechanism including a dwell-producing member so connected with the stitch-forming mechanism as to produce a semi-rotation thereof while the longitudinal feed of the work is arrested for stitching an end of the buttonhole. The work-holder derives its longitudinal feeding movements from a connection with the feeding mechanism, and comprises pairs of separable clamping jaws movable laterally toward and from each other and adapted to be drawn together into clamping relation by means of a toggle connection with an operating rock-shaft having a loose connection with a slide-plate suitably constructed and connected with the laterally movable clamping jaws to cause them to be separated and drawn together by the clamp-jaw closing and opening movements of the rock-shaft.

In the present embodiment, the stitch-forming and feeding mechanisms are adapted to be connected for operation by one driving element while two independent trains of mechanism are adapted for operative connection with another driving element for effecting the operation of a slit-cutting mechanism and the clamp-opening and closing device, the former being actuated once and the latter twice in each complete cycle of the machine. The clamp-operating mechanism includes a rock-lever having a permanent connection with the operating rock-shaft of the traveling work-holder, which is an important feature of the construction, especially with different adjustments of feed-traverse to which the clamp-operating mechanism adjusts itself without any change consequent upon the adjustment of the feeding mechanism.

Figure 2:
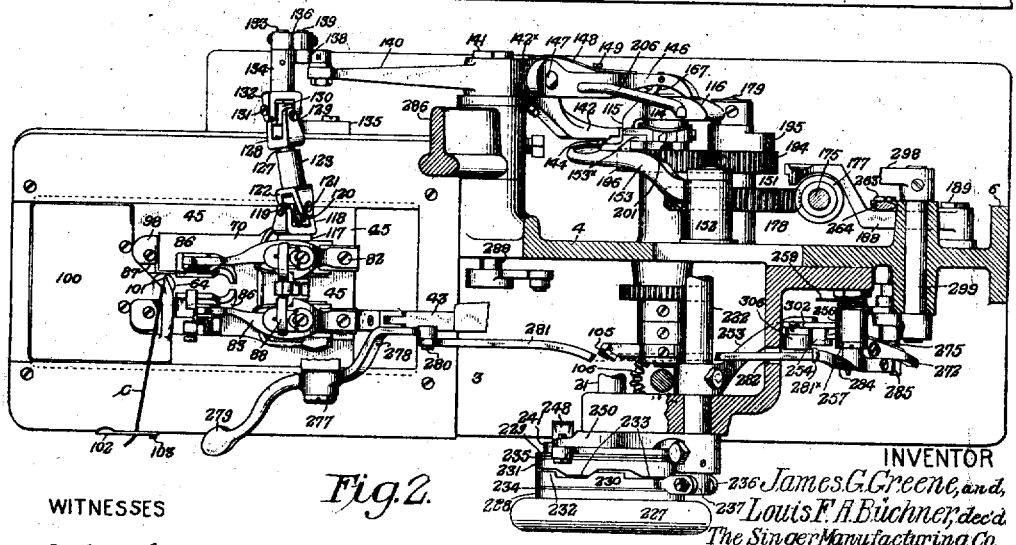
Figure 3:
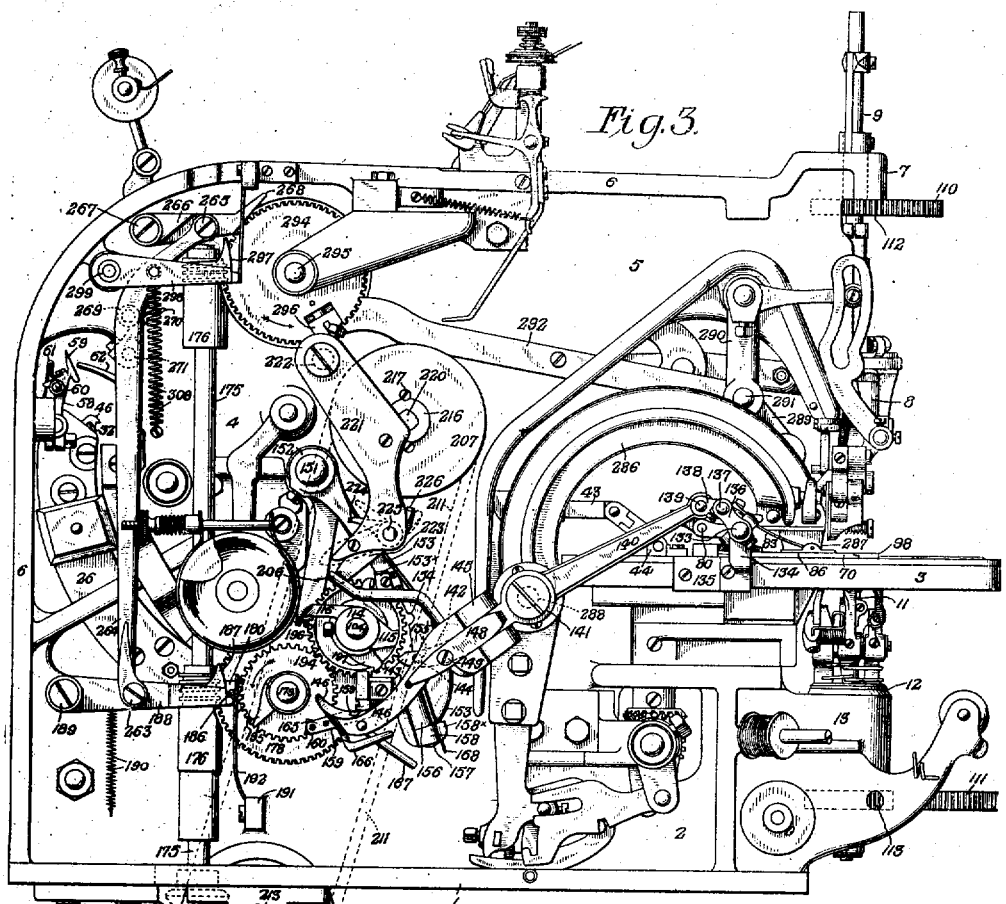
Figure 6:
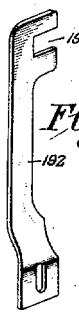
Figure 7:
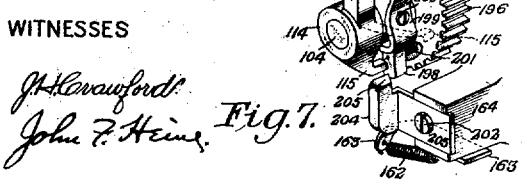
Figure 9:
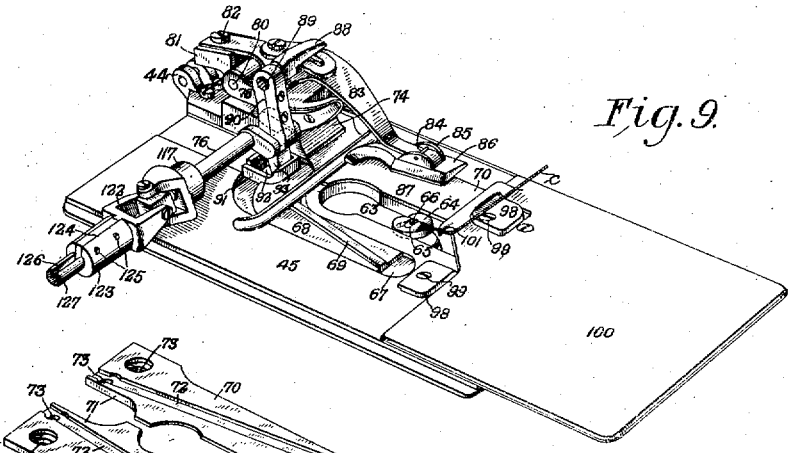
Figure 10:
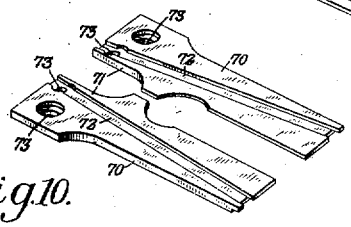
Figure 11:
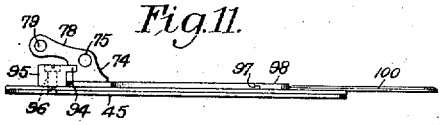
Figure 8:
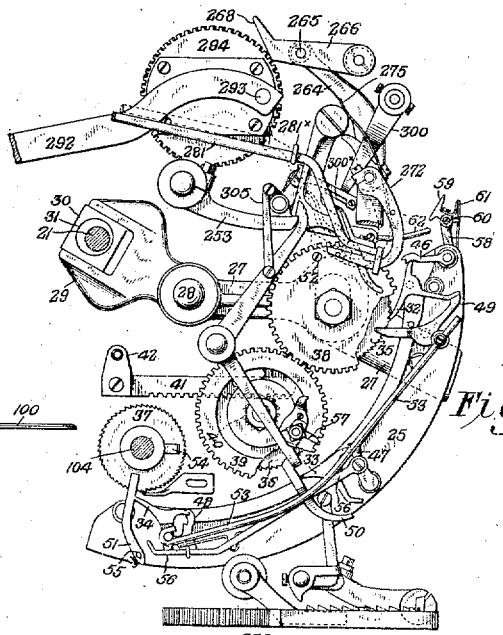
Figure 12:
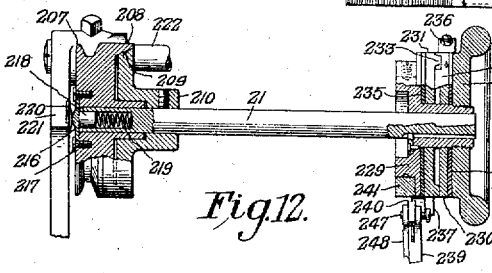

The invention will be understood by reference to the drawings annexed hereto, in which Figure 1 is a front side elevation of a buttonhole stitching and cutting machine embodying the same and containing stitch-forming, feeding and slit-cutting mechanisms constructed in substantial accordance with our applications Serial No. 576,639, filed Aug. 11, 1910, and Serial No. 597,113, filed Dec. 13, 1910; and Fig. 2 is a plan of the same with the frame in section above the work-plate. Fig. 3 is a rear side elevation of the machine and Fig. 4 a bottom plan of a portion thereof showing the clamp-operating mechanism from the under side. Fig. 5 is a perspective view of a portion of the worm-wheel coupling and uncoupling device and Fig. 6 a similar view of one of the elements thereof. Fig. 7 is a perspective view of the means for turning the stitch-forming mechanism backward through a semi-rotation into initial position after a stitching operation. Fig. 8 is a front elevation showing the feeding mechanism and controlling device in different positions from those represented in Fig. 1. Fig. 9 is a perspective view of the work-clamp with one pair of the clamping jaws and certain other parts omitted to expose constructive features thereof, and Fig. 10 a perspective view of the under side of the lower clamping jaw-plates. Fig. 11 is an edge view of the clamp slide-plate and the lower clamping-jaw-plates applied thereto. Fig. 12 is an elevation, partly in section, representing the driving shaft with the clutch mechanism applied thereto.

As represented in the drawings, the machine is constructed with a frame comprising the bed-plate 1 from which rises the lower base member 2 supporting the fixed work-plate 3 and the standard 4 with overhanging arm 5 constituting the upper frame member which latter, with the standard 4, is strengthened by the rib 6. The arm 5 carries the upper and lower bearing bosses 7 and 8 for the rotary bushings in which is journaled the reciprocating needle-bar 9 carrying the needle 10 which coöperates in the production of overseam stitches with looper mechanism 11 carried by the rotary bushing 12 journaled in the bearing boss 13 of the base member 2. The needle-bar receives its reciprocatory movements through a link connection 14 with the forward end of a rock-lever 15 fulcrumed at 16 upon the arm 5 and having its rearward end connected by means of the pitman 17 with a crank-pin 18 carried by a pinion 19 driven by a gear 20 fixed upon the transverse main or driving shaft 21. The looper mechanism derives its operative movements from a connection with the lateral arm 22 of an angle-lever fulcrumed at 23 upon the base member 2 and having an upright arm 24 deriving vibratory movements from a connection with the main-shaft. The needle receives its overseaming or lateral jogging movements from a rock-lever 25 fulcrumed upon the arm 5 and also deriving its rocking movements from a connection with the driving shaft.

The segmental feed-pawl carrying plate 26 is mounted upon a vibrating lever 27 which is fulcrumed upon a stud 28 sustained by the standard 4 and is provided with a forked arm 29 embracing a slide-block 30 fitted upon the actuating eccentric 31 of the main-shaft 21 which thus imparts operative jogging movements to the plate 26. This feed-pawl carrying plate has pivotally mounted thereon the spring-pressed plural-armed pawls 32, 33 and 34 adapted for operative engagement respectively with the peripheral teeth of the ratchet-wheels 35, 36 and 37, the ratchet-wheels 35 and 36 being connected for simultaneous rotation by means of the intermeshing gear or feed wheels 38 and 39 while the ratchet-wheel 37, as regards the feeding mechanism, exercises the function of a dwell-producing member without effect in imparting longitudinal feeding movements to the work.

Fixed to and adapted to rotate with the ratchet-wheel 36 and gear-wheels 39 is the feed-pinion 40 meshing with the sliding rack 41 which carries the upwardly projecting plate 42 operatively connected by means of the sectional link-bar 43 with a lug 44 at the rearward end of the work-holder slide-plate 45 adapted for longitudinal and transverse sliding movements upon the work-plate 3 for imparting to the work traveling movements to space the stitches.

A series of spring-pressed detent-levers 46, 47 and 48 is pivotally mounted upon the jogging pawl-carrying plate 26 each adjacent one of said pawls, and is formed with a notched extremity adapted for engagement with an arm of said pawl. A series of pawl-lifting levers 49, 50 and 51 is also mounted upon the pawl-carrying plate, each adjacent its respective pawl.

When the machine is at rest, all of the pawls are disengaged from their respective ratchet-wheels. At the beginning of a stitching operation, the detent-pawl 46 is retracted and the pawl 32 caused to assume operative relation with the ratchet-wheel 35, thereby imparting reverse step-by-step rotary movements to the intermeshing gear-wheels 38 and 39 and imparting through the pinion 40, rack 41 and sectional link-bar 43 the requisite traveling movements to the work-holder for the first side-stitching operation. Upon the engagement of the stud-pin 52, carried by the gear 38, with a lateral arm of the pawl-lifting member 49, the latter is rocked to retract the pawl 32 which is detained in inoperative position by the detent-lever 46.

The rocking of the pawl-lifter 49 acts through the connecting rod 53 to retract the detent-lever 48 to permit the pawl 34 to assume operative relation with the ratchet-wheel 37 which continues during the stitching of the end of the buttonhole, at the completion of which the engagement of the tripping lug 54, moving with the ratchet-wheel 37, with a lateral arm of the pawl-lifter 51 causes the extremity of the pawl-lifting arm to engage a lateral arm of the pawl 34 to retract the same to inoperative position, and simultaneously the engagement of a pin 55 carried by said pawl-lifter with the inturned extremity of the push-rod 56 connected with the detent-lever 47 causes the retraction of the latter to permit the operative engagement of the pawl 33 with the reverse-feed ratchet-wheel 36, whereby the work-holder is moved in the opposite direction for the stitching of the second side of the buttonhole.

The gear-wheel 39 carries the adjustably mounted tripping stud 57 which operates through mechanism to be hereafter described in arresting the rotation of the main-shaft to interrupt the stitching and feeding actions. In the present instance tripping stud 57 is clamped within the walls of an annular groove formed in said gear-wheel 39, and is adapted to be adjusted therein after release of the clamping means, which may be of any suitable form. It will be seen that the position of tripping stud 57 on gear-wheel 39, with respect to lever 262, will determine the length of traverse of the work-clamp. When stud 57 is adjusted on gear-wheel 39 to insure a greater or a less partial revolution of said wheel before said stud trips lever 262 to stop the stitching mechanism, the movement of tripping stud 52 carried by gear-wheel 38 is changed accordingly, by the increased or diminished movement of the intermeshing gear-wheels, so that the succeeding forward and backward movements of the work-clamp are uniform. The detent-lever 46 is shown provided with an upwardly extending arm 58 carrying a tilting contact-plate 59 pivoted thereto by means of the stud 60 and normally maintained in inclined position, as represented in Figs. 1 and 8, by means of the spring 61. The descent of a tripping rod 62 carried by an element of the stop-motion device from the position represented in Fig. 1 to that shown in Fig. 8 brings the extremity of said rod into operative engagement with the contact-plate and thrusts the same backwardly so as to disengage the detent-lever 46 from the feed-pawl 32 to set the feeding mechanism in action at the beginning of a buttonhole stitching operation. While the contact-plate is so mounted, in a manner well know, as to maintain a rigid relation with the supporting arm 58 during the descent of the rod 62, the upward movement of the latter following the tripping of the stop-motion serves to merely tilt the contact-plate out of its own path of movement without rocking the pawl-detainer to prematurely release the initial feed-pawl.

The work-holder slide-plate 45 is formed with the usual central longitudinal slot 63 embracing the needle-throat 64 containing the needle-aperture 65 and gimp-hole 66. Around the enlarged end portion of this slot is a U-shaped recess 67 in which is fitted for longitudinal movement the correspondingly shaped spreader slide-plate 68, the parallel branches of which are provided upon the upper faces with convergent guide-lips 69. Mounted upon the slide-plate 45 and overlapping the spreader slide-plate 68 are two clamp-plates 70 with their adjacent edges shaped to conform with the slot 63 and provided also with complemental clearance recesses 71, and provided also on their lower faces with convergent grooves 72 fitted to the ribs 69 of the slide-plate 68.

Secured to the plates 70 by means of screws entering apertures 73 therein, are the bearing blocks 74 provided with alined bearing apertures 75 to receive the operating crank-shaft 76 provided with the crank 77, the blocks 74 having rearward extensions 78 with bearing apertures 79 to receive the fulcrum-pins 80 of the clamp-arm sustaining blocks 81 to which are secured by means of fastening screws 82 the spring clamp-arms 83 having connected to their outer ends by means of the pivotal pins 84 the spaced lugs 85 of the tilting clamping feed 86 affording the upper jaws of a fabric clamp whose lower jaws 87 are afforded by the upper faces of the clamp-plates 70. The clamp-arms 83 are embraced intermediate their ends by the forked opposite extremities 88 of a pin 89 which is journaled in the upper end of a split link 90 whose opposite end embraces the pin connecting the crank-arms 77 of the rock-shaft 76. The turning of the rock-shaft 76 forwardly, as viewed in Fig. 9, serves to draw the pin 89 downwardly to depress the clamp-arms 83 and close the clamp upon the work.

At its rearward end, the spreader-plate 68 is formed with an extension 91 containing an aperture 92 whose end walls afford shoulders for engagement of a finger 93 depending from the link 90. The length of the aperture 92 is considerably greater than the width of the finger 93 so that the latter completes a portion of its lateral movement under the influence of its actuating crank-pin before engagement with the spreader-plate extension which latter partakes therefore of a portion only of the entire lateral motion of the link.

As will be observed, the turning of the rock-shaft 76, whose crank is at the side thereof when the clamp is opened, as represented in Fig. 9, causes the immediate depression of the clamp-arms during the initial descent of the crank-pin which is nearly completed before the finger 93 encounters the rearward end of the aperture 92 when the spreader-plate 68 is drawn backwardly and the two clamp-plates 70 forced apart by engagement of the convergent guide-ribs 69 with the clamp-plate grooves 72 entered thereby. As the parts are constructed and arranged to allow the cranks 77 to pass beneath the rock-shaft 76, it will be observed that the members 77 and 90 constitute a toggle device which, when thus straightened, affords locking means in the work-holder itself for maintaining the clamp yieldingly closed upon the work.

The bearing blocks 74 are provided in their rearward sides with guideways entered by lateral tongues 94 of the guide-bars 95 secured by means of the screws 96 to the slide-plate 45; and the undercut forward edges 97 of the plate 70 are fitted to the similarly shaped rearward edges of guide-blocks 98 secured by means of screws 99 upon the slide-plate 45 adjacent the forward extremities of the recess 67. By these means, the clamp-plates 70 are sustained upon the slide-plate 45 for movement toward and from each other under the action of the spreader-plate 68.

Secured upon the forward portion of the slide-plate 45 is an extension-plate 100 whose rearward extremity overlaps the forward end of the slot 63 and is provided with a gimp-holding spur 101 beneath which the gimp *c* is adapted to be drawn from the gimp-hole 66 of the needle-throat and thence laterally to the edge of the work-plate and beneath the holding nipper-spring 102 secured in position by the screw 103. In starting a buttonhole stitching operation the gimp is thus led parallel with the direction of feed and is suitably located to receive the initial overseam stitches of the edge-covering seam.

The ratchet-wheel 37 is fixed upon the forward end of the transverse shaft 104 and has rigidly connected therewith the toothed sector 105 meshing with but having a diameter double that of the bevel pinion 106 mounted upon the upright shaft 107 provided at the upper and lower ends with the pinions 108 and 109 engaging the teeth at the rearward ends of the rack-bars 110 and 111 provided with teeth at their forward ends in mesh with the pinions 112 and 113 fixed respectively to the upper needle-bar bushing and the rotary looper-carrier. At its other end, and upon the rearward side of the standard 4, the shaft 104 has secured thereon a collar 114 provided upon one side with a radially and forwardly projecting finger 115 and upon the other side with a substantially radial cam-arm 116. The period of engagement of the pawl 34 with the ratchet-wheel 37 is such that the sector 105 with its supporting shaft 104 is given a quarter-turn while the upright shaft 107 receives a half-turn, thereby imparting to the upper and lower elements of the stitch-forming mechanism a semi-rotation intermediate the forward and backward feeding movements of the work-holder for stitching around the eye of the buttonhole.

The rearward end of the clamp-arm actuating shaft 76 has fixed thereon the collar 117 provided with a fork 118 in which is pivotally mounted by means of the screws 119 the block 120 embraced by and pivotally connected by screws 121 with the fork 122 of a sleeve 123 longitudinally slotted to receive a feather 124 secured therein by means of the transverse pins 125, as represented in Fig. 9. The feather 124 enters a keyway 126 of a shaft 127 slidingly fitted within the sleeve 123 and carrying a fork 128 pivotally connected by means of screws 129 with the block 130 embraced by and pivoted by means of screws 131 within the fork 132 of the rock-shaft 133 journaled within and sustained by a bearing bracket 134 whose foot 135 is secured to the rearward edge of the work-plate 3. The intermediate shaft 127 has thus universal joint connections with the shafts 76 and 133.

The rock-shaft 133 has secured upon its rearward end the crank-arm 136 carrying the stud-pin 137 entered by one of the apertured ends of the link 138 whose opposite end embraces the stud-pin 139 carried by the forwardly extending arm 140 of the clamp-operating rock-lever sustained by the fulcrum-screw 141 and provided with a rigid rearwardly extending and inwardly offset arm 142 terminating in a nose 143 and carrying a lateral pin 144. This rock-lever is provided with an apertured lug 142× adjacent its hub and embraced by the forked rearward extremity 145 of a laterally swinging arm 146 pivoted to said lug by means of the transverse pin 147. The swinging arm 146 is normally maintained yieldingly in substantial alinement with the rigid arm 140 by means of a flat spring 148 secured thereto by means of a screw 149 with one end resting upon itself and the other upon the lug 142×, a stop being afforded by the end of the fork in the end portion 145 or by engagement of the latter with the point of a stop-screw 150 tapped into the rigid arm 142.

Sustained by the standard 4 is a fulcrum-stud 151 upon which is mounted the hub 152 of a swinging locking lever 153 carrying the contact-plate 153× adjacent one edge which is formed with spaced locking notches 154 and 155 to receive the pin 144 of the rock-lever arm 142, and provided at its lower end with an apertured boss 156 to which is pivotally connected by means of the pin 157 the offset extremity 158 of a swinging arm 159 carrying a contact-block 160 adjacent the inturned extremity 146× of the swinging lever-arm 146.

Figure 4:
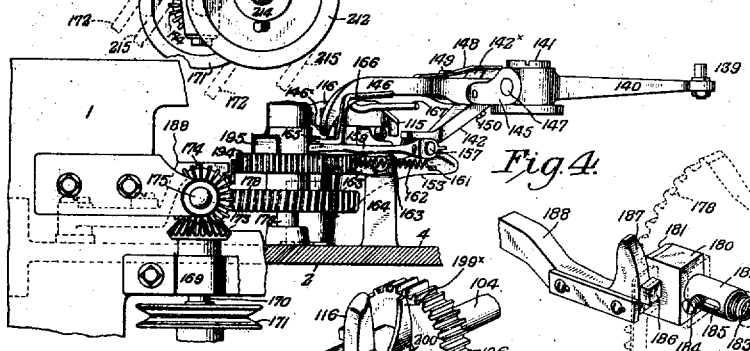
Figure 5:
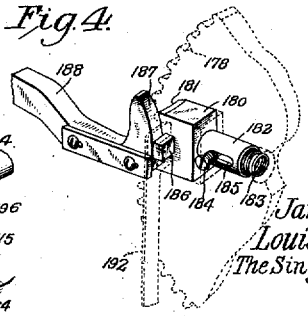

As represented in Fig. 4, the locking arm 153 carries a stud-screw 161 embraced by one end of a spring 162 whose opposite end is attached to a plate 163 secured to a stud 164 projecting from the standard 4, whereby the locking arm is maintained yieldingly in operative relation with the pin 144. To the free end of the swinging arm 159 is secured the foot 165 of a bent rod 166 adapted for engagement by a rod 167 rigidly secured to and depending from the swinging rock-lever arm 146. The lever 153 has secured thereto a straight wire spring 168 which rests against an ear 158× of the member 158 to press the arm 159 inwardly, whereby its rod 166 is maintained in yielding contact with the rod 167 carried by the swinging rock lever-arm 146.

Suitably mounted in a bearing bracket 169 beneath the bed-plate 1 is a counter-shaft 170 provided with a grooved pulley 171 embraced by a belt 172 from the source of power. The shaft 170 carries a bevel pinion 173 meshing with a similar pinion 174 fixed upon the upright worm-shaft 175 journaled in bearings 176 of the frame and provided above the lower bearing with a worm 177 meshing with the peripheral teeth of a worm-wheel 178 mounted upon the shaft 179 journaled in suitable bearings sustained by the frame.

As represented more particularly in Fig. 5, the worm-wheel 178 is cut out in one side to form a radial recess for reception of the slide-block 180 formed in one end with the complemental worm-teeth 181 and at the other end with a hollow boss 182 slidingly fitted within a radial socket of the worm-wheel and provided with the spring 183 normally pressing said block outwardly into register with the adjacent peripheral worm-wheel teeth, its range of movement being limited by the stop-screw 184 extending through the side of the worm-wheel into a longitudinal slot 185 in the boss 182 whose ends it is adapted to engage.

The slide-block 181 has a lateral lug 186 whose outer wedge-shaped extremity is normally engaged by the cammed end 187 of the laterally extending controlling lever 188 fulcrumed upon the stud-screw 189 and drawn downwardly so as to rest upon the top of the lower worm-shaft bearing 176 by means of the spring 190. Projecting upwardly from a lug 191 upon the base 2 is a spring detent-arm 192 whose enlarged upper end is provided in one edge with a notch 193 normally embracing the lug 186 of the yielding worm-wheel section 181 in its inner or retracted position, when engaged by the heel of the cammed extremity 187 of the lever-arm 188. By the lifting of the lever-arm the lug 186 is released and the worm-wheel section pressed by its spring 183 into operative relation with the worm 177 whereby a rotary movement of the worm-wheel 178 is inaugurated which continues until the completion of a rotation, when the retraction of the worm-wheel section by encounter of the lug 186 with the cam-member 187 interrupts the operative relation between the worm and worm-wheel and causes the latter to stop. The engagement of the inner face of the lug 186 with the outer face of the detent-arm 192 causes the deflection of the latter until the lug comes in register with the holding notch 193, when the detent-arm snaps into normal position with its notch embracing said lug, thereby locking the worm-wheel in initial position.

Secured to and adapted to rotate with the worm-wheel 178 is a gear-wheel 194 to which is rigidly connected the radially extending clamp-opening tappet 195. Loosely mounted upon the transverse shaft 104 and in intermeshing relation with the gear 194 is the gear 196 upon the hub of which is secured the rigid clutch-lever shifting tappet 197 and the pivotally mounted tappet 198 formed with a yoke 199 embracing said hub and sustained thereon by means of the pivot screws 200. Interposed between the tappet 198 and the bottom of a socket formed in the face of the gear 196 is a spring 201 (Fig. 7) maintaining said dog yieldingly in normal position wherein a stop-arm 199$^{x}$ forming an extension of one member of the yoke 199 rests in contact with the face of the gear 196, and in which position relative to the sustaining gear 196 the said tappet moves in a path in which are normally located the contact-block 153$^{x}$ of the locking lever 153, the nose 143 of the rigid rock-lever-arm 142 and the end of the finger 115 upon the fixed collar 114.

Upon the channeled outer end of the stud 164 is secured by means of the screw 202 the shank 203 of a tripping lug 204 having an inclined operative face 205 arranged in the normal path of circular movement of the tappet 198 and with its inner extremity in substantial register with the inner end of the finger 115 in the initial position of the stitch-forming mechanism prior to the stitching of the eye of the buttonhole. In performing a rotation, the tappet 198 engages one side of the finger 115 in the dotted line position thereof represented in Fig. 7, and carries it around into the full line position of said figure at which point the inclined operative face 205 of the tripping lug deflects the tappet inwardly in opposition to its spring 201 and thereby disengages it from the finger 115 which remains in such position during the remainder of the rotation, and by the quarter-turn of the shaft 104 thus effected, the stitch-forming mechanism is given a retrograde half-turn following a semi-rotation for an eye-stitching operation.

An initial rotation of the gears 194 and 196 is produced by lifting the cam-lever 188 to establish operative relation between the worm 177 and worm-wheel 178. In the initial starting position of the parts, the rock-lever 140 142 is in its less inclined clamp-opening position in which the nose 143 of the arm 142 is close to and beneath the contact-plate 153$^{x}$. As the spring-pressed tappet 198 performs a rotation, it first engages the plate 153$^{x}$ to retract the locking lever 153 from engagement of its upper notch 154 with the pin 144, after which the tappet engages the nose 143 of the swinging rock-lever-arm 142 and tilts the rock-lever to turn the clamp rock-shaft 76 whereby the clamp-jaws are successively closed upon the work and spread.

In its tilting movement with the rock-lever 140, 142, the swinging arm 146 is thrown outwardly from the path of movement of the clamp-opening tappet 195 by engagement of a bent rod 206 with the rounded nose of the cam-arm 116 which is at this time in a substantially vertical position upon its now stationary supporting shaft 104 previous to the eye-stitching operation. The engagement of the rod 167 with the rod 166 at the same time draws the swinging arm 159 of the locking lever out of the path of movement of said tappet 195, so that the latter performs an idle rotation at this time. After the stitching of the first side of the buttonhole, the stitch-forming mechanism receives a semi-rotation as before explained, whereby the shaft 104 is given a quarter-turn and the finger 115 and cam-arm 116 assume the positions represented in Fig. 3 wherein the cam-arm is retracted from engagement with the rod 206 so as to permit the nose 146× of the swinging arm 146 and the contact-block 160 of the locking lever-arm 159 to return under the action of the springs 148 and 168 into the path of travel of the tappet 195.

At the end of a buttonhole stitching and cutting operation, a second lifting of the cam-lever 188 causes a final rotation of the gears 194 and 196, during which the tappet 198 incidentally shifts the locking lever 153 but passes without engaging the nose 143 of the lever-arm 142 in its lower position, but it engages the finger 115 and carries it around until disengaged therefrom by the tripping lug 204 as before described. After the engagement and release of the locking lever 153 by the tappet 198, the engagement by the tappet 195 with the contact-block 165 carried by the swinging arm 159 of the locking lever 153 again disengages the lever 153 from the pin 155 and while the rock lever 140 142 is thus unlocked, engages the nose 146× of the arm 146, thereby tilting the rock-lever to open the clamp and draw its jaws together for a succeeding operation, the rod 206 being carried upward by this movement sufficiently to clear the cam-arm 116 in its return to initial position. It will thus be seen that the shaft 175 is driven independently of the stitch-forming and feeding mechanisms and constitutes an actuator for the slit-cutting and clamp-operating mechanism and that said mechanisms are positioned beyond the range of action of said actuator, during the stitching of the buttonhole. The actuator merely turns idly until the toothed sections 180 and 296 of the gears 178 and 294, respectively, are released and permitted to move within the range of action of the worm-wheels carried by the shaft 175.

The machine is equipped with an automatic stop motion for establishing and interrupting driving relation between the main-shaft 21 and the stitch-forming and feeding mechanisms. In the present instance the main-shaft 21 has loosely mounted upon its rearward end the peripherally grooved pulley-wheel 207 formed in its inner face with a cavity provided with a conical rim 208 to afford a clutch-member adapted to be pressed into operative frictional engagement with the conical rim of a clutch member 209 having its hub 210 fixed upon the main-shaft. The peripheral groove of the pulley-wheel 207 is adapted to receive the driving belt 211 extending from a double-grooved pulley 212 upon a counter-shaft 213 mounted in bearings 214 depending from the bed-plate and driven by a belt 215 from the source of power.

The pulley-wheel 207 has in its outer face a thrust-plate 216 provided with a convex central portion and secured thereto by means of fastening screws 217. This thrust-plate is normally pressed outwardly for disengagement of the clutch-members 208 and 209 by means of a plug 218 fitted within an axial socket of the shaft 21 with a spring 219 interposed between the inner end of said plug and the bottom of the socket.

The thrust-plate 216 is adapted to be engaged by the inclined adjacent face of a wedge-piece 220 secured to the clutch-lever 221 fixed upon the rearward end of a transverse rock-shaft 222 and carrying upon its outer end the pivotally mounted nose-piece formed with the angularly disposed arms 223 and 224 pivotally mounted upon said lever at their intersection by means of the pin 225. The arm 223 is sustained in normal position by engagement of the stop-lug 226 of the nose-piece with the edge of the lever 221, and the outer end of the same lies in the path of movement of the tappet 197 at the beginning of a cycle of the machine, and as represented in full lines in Fig. 3. In the initial rotation of the gearing 194 196, the tappet 197 acts upon the tripping piece immediately after the closing of the clamp and forces the clutch-lever 221 forwardly to couple the main-shaft with its constantly running driving element 207.

Fixed upon the forward end of the main-shaft 21 is a hand-wheel 227 having a hub portion 228 which constitutes one of two spaced thrust members of which the other is a fixed disk 229. Loosely mounted upon the shaft 21 between the thrust members 228 and 229 is a pair of collars shown as circular plates or disks 230 and 231 having upon their adjacent faces respectively the wedge-shaped projections or teeth 232 and 233 adapted for wedge-like engagement, when said disks are relatively turned, to force them apart into frictional engagement with the adjacent thrust members or interposed washers 234 and 235.

The disk 230 is provided with a forked lug 236 embracing the forward end of the rock-shaft 222 by means of which it is restrained against rotation with the main-shaft. The other disk 231 has a lateral arm 237 upon which is fulcrumed by means of the screw 238 the elbow-lever 239 formed with a lateral arm carrying a wearing block 240. The wearing block is adapted to rest upon the eccentric periphery of a cam-ring 241 secured upon the hub of the disk 229. A depending arm of the elbow-lever 239 carries a stud 242 which enters a curved slot 243 in the cam-lever 244 fulcrumed by means of the stud-screw 245 upon the post 246 rising from the bed-plate 1.

The cam-lever 244 is connected by means of the screw-bolt 247 with the lower end of a link 248 whose upper end is attached by means of the screw-stud 249 to the forwardly projecting crank-arm 250 fixed upon the rock-shaft 222. The link 248 is normally drawn downwardly by a spring 251 to normally seat a stop-arm 252 thereof upon the flattened upper end of the standard 246.

The rock-shaft 222 has also fixed thereon the rearwardly extending forked arm 253 provided with the short branch 254 and the longer branch 255 carrying the feed-tripping rod 62 before mentioned. The branch 254 is adapted for engagement by the operative shoulder of the angular latch-lever 256 mounted upon the fixed fulcrum-screw 257 and having a rearwardly extending tail 258, such lever being pressed into operative engagement with the member 254 by means of a spring 259 coiled around its fulcrum-stud 257. The member 254 of the arm 253 is also adapted for engagement by the hooked outer end of the upwardly extending arm 260 of an angular locking lever fulcrumed upon the stud 261 and having a tripping arm 262 whose inturned extremity lies in the path of movement of the tripping stud 57 carried by the gear-wheel 39. The tripping lever 260 262 is provided with the usual spring for throwing it into operative engagement with the member 254 of the arm 253.

The cam-lever 188 carries a stud 263 embraced by the lower end of an upright rod 264 whose apertured opposite end embraces a stud-screw 265 of a lever 266 mounted upon the fulcrum-screw 267 and having an inclined outer end portion 268. Near the upper end, the rod 264 carries a roller-stud 269 adapted for engagement by the cam-finger 270 fixed upon the rocking pin 271 which is journaled in the standard 4 and has fixed upon its opposite end a depending arm 272 with its lower extremity bent forwardly into an extension 273 formed intermediate the ends with a shoulder 274. The arm 272 is normally pressed backwardly into retracted position by means of a spring 275 secured thereon and having an arm resting upon the hub of latch lever 256.

Secured to the frame member 5 is a bracket 276 carrying a fulcrum-stud 277 upon which is mounted the rock-lever 278 the forward depending arm of which is formed with a finger-piece 279 and the upwardly and rearwardly extending arm of which carries a pivotal pin 280 to which is connected one arm of the starting rod 281 which passes through an aperture 282 in the bracket 283 and is formed with an outwardly and rearwardly directed extension 284 formed at its rearward extremity with a depending forked lug 285 embracing the extension 273 of the arm 272 and resting thereon intermediate the body of said arm and the shoulder 274. The starting rod is shown formed with a stop-lug 281[x] adapted for engagement with the bracket 283 to limit the operative movement of said rod.

In the drawings, the parts are represented with the work-holder closed and the slit-cutting mechanism in the positions assumed in a slit-cutting operation, the main-shaft with its controlling devices and the mechanism connected therewith being under the same conditions as exist at the beginning of a cycle of operation of the entire machine. To follow through a complete cycle of the machine, it is therefore necessary only to assume that the slit-cutting has been completed and the clamp opened in readiness for a succeeding stitching and cutting operation.

Pressure upon the finger-piece 279 of the rock-lever 278 draws the starting rod 281 forward and thereby engages the forked lug 285 of the latter with the shoulder 274 of the rocking arm 272, which causes the turning of the cam-finger 270 to lift the rod 264 for imparting an operative cycle of movement to the clamp-operating mechanism. The shifting of the clutch-lever 221 into operative position by this means serves to rock the shaft 222 by means of which the arm 253 is lowered into running position where it is initially retained by the spring-actuated latch-lever 256. The rocking of the shaft 222 further causes the elevation of the arm 250 and consequent rise of the cam-lever 244, the action of whose cam-slot 243 upon the stud 242 is to disengage the contact-block 240 from the cam-disk 241 and remove the friction upon the thrust-members 228 and 229.

The described movement of the arm 253 throws the tripping rod 62 into engagement with the contact-plate 59, whereby the detent-lever 46 is disengaged from the initial feed-pawl 32 and the feeding mechanism is thrown into action simultaneously with the starting of the main-shaft. The recession of the tripping stud 57 from the locking lever-arm 262 permits the locking arm 260 to engage the extremity 254 of the rock-shaft arm 253 to retain the same in running position after the disengagement therefrom of the latch-lever 256 by the action of the stud 52 upon the gear-wheel 38. In the stitching of the second side of the buttonhole the feeding mechanism reverses and the tripping stud 57 again moves into engagement with the locking lever-arm 262, thereby shifting the same to disengage the arm 260 from the rock-shaft arm 253. This permits the rock-shaft 222 to be rocked under the action of the spring 251 for retraction of the clutch-lever 221 in disengaging the clutch-members 208 and 209 for disconnecting the main-shaft from its driving element, and at the same time the descent of the link 248 causes a corresponding movement of the cam-lever 244 which rocks the elbow-lever 239 to bring the contact-block 240 into forcible engagement with the periphery of the cam-ring 241 by means of which the pressure disk 231 is turned to engage its teeth with those of the disk 230 whereby friction is applied to the thrust-members 228 and 229 to arrest the shaft 21.

As shown and described in our Patent No. 1,035,344, dated August 13, 1912, the slit-cutting mechanism comprises the rock-lever 286 carrying an upper cutter-member 287 and sustained by a rock-shaft 288 concentric with the fulcrum-screw 141 for the clamp-operating rock-lever. The lower cutter-member is moved into and out of operative relation with the upper cutter-member for a cutting operation by means of a connection with the rock-lever 286 which is itself actuated by a toggle device composed of links 289 and 290 connected by the pivotal pin 291 which is embraced by the forward end of a link-bar 292 having its apertured opposite end entered by a crank-pin 293 upon a worm-wheel 294 mounted upon a supporting stud 295. Like the worm-wheel 178, the worm-wheel 294 has a radially movable toothed section 296 controlled in its action by the cammed extremity 297 of a lever 298 mounted upon a rock-shaft 299 having secured upon its opposite end the depending arm 300 formed with a lateral lip 300×.

The lip 300× of the arm 300 is adapted to be engaged by the hooked extremity 301 of a pawl-lever 302 pivotally mounted upon an upwardly extending arm 303 of an angle-lever fulcrumed upon a stud 304 carried by an upwardly projecting ear 305 of the rock-shaft arm 253 and having a lateral arm 306 which is connected by means of the link 307 with the locking lever-arm 260. When the rock-shaft arm 253 is depressed in starting the main-shaft, the angle-lever 303 306 is carried downward bodily and is rocked by its link connection 307 with the stationary lever-arm 260, whereby the pawl-lever 302 is caused to rest upon the lip 300× of the arm 300 of the cutter-controlling device. As the arm 253 rises at the completion of a stitching operation, the angle-lever 303 306 is rocked so as to draw the pawl-lever 302 forwardly and thereby shift the arm 300 to lift the cam-arm 298 in opposition to its spring 308 to throw the cutter mechanism into action. One of the jointed sections of the link-bar 43 is slidingly mounted within a guide-way 309 of a rising and falling frame 310 connected with and actuated by the cutter rock-shaft 288 in such manner that when the upper-cutter carrying arm 286 descends for a cutting action, the frame 310 rises and retracts the work-clamp from stitching position into cutting position from which it is returned by the descent of the frame 310 effected by the reverse movement of the lever 286.

Just prior to the completion of a rotation of the cutter-actuating worm-wheel 294, the rearward end of the link-bar 292 engages the inclined forward extremity 268 of the lever 266 thereby lifting the rod 264 and imparting the second operative movement to the cam-lever 188 to effect the final cycle of operation of the actuating mechanism for the clamp-operating rock-lever, the operation of which is as has been already described.

In the rise of the laterally swinging lever-arm 146 under the action of the tappet 195 in opening the work-clamp, the end of the rod 206 encounters the arm 224 of the nose-piece carried by the clutch-lever 221, thus turning the same into the dotted line position represented in Fig. 3, wherein the arm 223 is lifted out of the path of movement of the still moving tappet 198 so as to prevent a reclutching of the main-shaft to its driving element 207 at this time.

While the several trains of mechanism associated together in the machine shown in the drawings have been described in detail, both as to their constructive features and their coöperation in the production of a stitched buttonhole, it is to be understood that the invention embodied therein is susceptible of embodiment in different types of mechanism and in widely different forms and relations than those shown and described herein.

Having thus set forth the nature of the invention, what we claim herein is—

1. In a buttonhole sewing machine, in combination, a work-clamp, stitch-forming and feeding mechanism, a stop-motion device, driving connections between said stop-motion device and said stitch-forming and feeding mechanisms, constantly running power means, and automatically controlled connections actuated by said power means independently of said driving connections for the stitch-forming and feeding mechanisms for opening and closing the work-clamp.

2. In a buttonhole stitching machine, the combination with a work-clamp, stitch-forming and feeding mechanisms, slit-cutting mechanism, and successively operating means for actuating the stitch-forming and feeding mechanisms and the cutting mechanism, of means acting independently of said actuating means for automatically closing and opening said clamp.

3. In a buttonhole stitching machine, the combination with a work-clamp, stitch-forming and feeding mechanisms, slit-cutting mechanism, and independent and successively operating means for actuating the stitch-forming and feeding mechanisms and the cutting mechanism, of means acting independently of said actuating means for automatically closing and opening said clamp, and controlling devices therefor whereby the successive closing and opening of the clamp are timed to occur respectively before and after the operation of said actuating means for the stitch-forming and feeding mechanisms and the cutting mechanism.

4. In a buttonhole stitching machine, the combination with a work-clamp, stitch-forming and feeding mechanisms, slit-cutting mechanism, and successively operating means for actuating the stitch-forming and feeding mechanisms and the cutting mechanism, of clamp-operating means acting independently of said actuating means for effecting the closing and opening of the clamp, means for effecting actuations of the clamp-operating means both before and after the operation of the stitch-forming, feeding and cutting mechanisms in each buttonhole-producing cycle, and controlling means whereby the clamp is caused to be alternately closed and opened.

5. In a buttonhole stitching machine, the combination with a work-clamp, stitch-forming and feeding mechanisms, means including a rotary shaft for operating the same, a constantly rotating driving element, and a clutch device including a swinging lever whereby said shaft may be coupled to the driving element, of clamp-actuating means with connections with the clamp whereby the latter is opened and closed, and means carried by said clamp actuating means and adapted to move the clutch lever into starting position for setting in motion the stitch-forming and feeding mechanisms.

6. In a buttonhole stitching machine, the combination with a work-clamp, stitch-forming and feeding mechanisms, means for imparting operative movements thereto, and means for turning the stitch-forming mechanism during the stitching of the eye of an eyelet-end buttonhole, of clamp-operating means independent of the operating means for the stitch-forming and feeding mechanisms whereby the clamp is opened and closed respectively at the beginning and end of a buttonhole-producing cycle, and means connected with the clamp-operating means for turning the stitch-forming mechanism into initial position after each stitching operation.

7. In a buttonhole stitching machine, the combination with a work-clamp, stitch-forming and feeding mechanisms, means for imparting operative movements thereto, and means for turning the stitch-forming mechanism during the stitching of the eye of an eyelet-end buttonhole, of clamp-operating means timed for action both before and after a buttonhole stitching operation and including a rotary element adapted in its first actuation to close the clamp and in its succeeding actuation to turn the stitch-forming mechanism into initial position.

8. In a buttonhole stitching machine, the combination with a work-clamp, stitch-forming mechanism, feeding mechanism for producing the reverse feeding movements between the stitch-forming mechanism and the work-clamp, and including dwell-producing means having a connection with the stitch-forming mechanism whereby the latter is given a semi-rotation for the stitching of one end of a buttonhole, and actuating means for the stitch-forming and feeding mechanisms, of clamp-operating means independent of the actuating means for the stitch-forming and feeding mechanisms whereby the clamp is opened and closed respectively at the beginning and end of a buttonhole-producing cycle, and means connected with the clamp-operating means for turning the stitch-forming mechanism into initial position after each stitching operation.

9. In a buttonhole stitching machine, the combination with stitch-forming mechanism, a work-clamp, and means for producing relative feeding movements between the stitch-forming mechanism and the work-clamp, of work-clamp operating means mounted separately from the work-clamp and adapted to close and open the latter, and a permanent connection between said operating means and the work-clamp adapted to follow said feeding movements.

10. In a buttonhole stitching machine, the combination with stitch-forming mechanism, a work-clamp, means for producing relative feeding movements between the stitch-forming mechanism and the work-clamp, and adjusting means whereby the length of relative traverse of the work-clamp and stitch-forming mechanism may be varied, of work-clamp operating means mounted separately from the work-clamp and adapted to close and open the latter, and a permanent connection between said operating means and the work-clamp adapted to follow said feeding movements.

11. In a buttonhole stitching machine, the combination with stitch-forming mechanism, a work-clamp provided with relatively movable upper and lower jaws and means including a toggle device for closing said jaws together and maintaining them closed during a stitching operation, and means for producing relative feeding movements between the stitch-forming mechanism and the work-clamp, of automatically acting work-clamp operating means mounted separately from the work-clamp, and a permanent connection between said operating means and said toggle device adapted to follow said feeding movements.

12. In a buttonhole stitching machine, the combination with stitch-forming mechanism, a work-clamp, and means for producing relative feeding movements between the stitch-forming mechanism and the work-clamp, of work-clamp operating means, a permanent connection between said operating means and the work-clamp adapted to follow said feeding movements, means applied to an element of said clamp-operating means for locking the same against operative movement during a stitching operation, and means for controlling the action of said locking means.

13. In a buttonhole stitching machine, the combination with stitch-forming mechanism, a work-clamp, and means for producing relative feeding movements between the stitch-forming mechanism and the work-clamp, of work-clamp operating means, a permanent connection between said operating means and the work-clamp adapted to follow said feeding movements, means applied to an element of said clamp-operating means for locking the same against operative movement both in clamp-opening and closing positions, and means for controlling the action of said locking means.

14. In a buttonhole stitching machine, the combination with stitch-forming mechanism, a work-clamp, and means for producing relative feeding movements between the stitch-forming mechanism and the work-clamp, of work-clamp operating means, a permanent connection between said operating means and the work-clamp adapted to follow said feeding movements, means applied to an element of said clamp-operating means for normally maintaining the latter in either of its extreme positions, and controlling means for disengaging the locking means from said element both before and after a buttonhole stitching operation.

15. In a buttonhole stitching machine, the combination with stitch-forming and feeding mechanisms and actuating means therefor, of a work-holder comprising pairs of separable clamping jaws movable laterally toward and from each other and formed with inclined grooves, a spreading plate provided with inclined ribs fitted within the grooves of said clamping jaws and with spaced shoulders, a clamp-operating device provided with contact fingers adapted respectively to engage the clamping jaws and the shoulders of the spreading plate, and actuating means for said clamp-operating device whereby the clamping jaws are successively closed upon the work and spread preparatory to the stitching operation.

16. A work-holder for buttonhole stitching machines comprising pairs of separable clamping jaws movable laterally toward and from each other, a toggle device for drawing said jaws into clamping relation, a slide-plate operatively connected with a member of said toggle device and provided with divergent guides each connected with one of the jaws of each pair, and means for actuating said toggle device for opening and closing said jaws and for imparting thereto relative lateral shifting movements.

17. A work-holder for buttonhole stitching machines comprising pairs of separable clamping jaws movable laterally toward and from each other, a toggle device for drawing said jaws into clamping relation, a slide-plate provided with divergent guides each connected with one of the jaws of each pair, a loose connection between an element of said toggle device and the slide-plate whereby the latter is caused to perform its operative spreading movement after the toggle device has performed the clamp-jaw closing portion of its movement, and means for actuating said toggle device.

18. In a buttonhole stitching machine, the combination with a work-clamp, stitch-forming and feeding mechanisms, slit-cutting mechanism, and independent and successively operating means for actuating the stitch-forming and feeding mechanisms and the cutting mechanism, of means independent of said actuating means for automatically closing the clamp, and means actuated by the clamp-closing means for setting in motion one of said actuating means.

19. In a buttonhole stitching machine, the combination with a work-clamp, stitch-forming and feeding mechanisms, slit-cutting mechanism, and independent and successively operating means for actuating the stitch-forming and feeding mechanisms and the cutting mechanism, of means independent of said actuating means for automatically closing the clamp, controlling means whereby the actuating means for the stitch-forming and feeding mechanisms may be thrown into and out of action, and an operative connection between said controlling means and the clamp-closing means.

20. In a buttonhole stitching machine, the combination with a work-clamp, stitch-forming and feeding mechanisms, means for imparting operative movements to the stitch-forming and feeding mechanisms, and means for turning the stitch-forming mechanism during the stitching of the end of a buttonhole, of clamp-closing means, clamp-opening means connected to and movable simultaneously with the clamp-closing means, and means controlled by the turning means of the stitch-forming mechanism for interrupting and establishing operative relation between the clamp-opening means and the clamp.

21. In a buttonhole stitching machine, the combination with stitch-forming mechanism, a work-clamp, and means for producing relative feeding movements between the stitch-forming mechanism and the work-clamp, of work-clamp operating means comprising a rock-lever, a flexible connection between the same and the work-clamp, and actuating means including two differentially moving tappets adapted to act positively upon said rock-lever to rock the same alternately in opposite directions.

22. In a buttonhole stitching machine, the combination with stitch-forming mechanism, a work-clamp, and means for producing relative feeding movements between the stitch-forming mechanism and the work-clamp, of work-clamp operating means comprising a rock-lever, a connection between the same and the work-clamp, and actuating means including two rotary tappets geared together for rotation in opposite directions, means for insuring the alternate engagement of said tappets with said rock-lever, and means for imparting to said tappets two rotations with an intermediate period of rest for each buttonhole stitching operation.

23. In a buttonhole stitching machine, the combination with stitch-forming mechanism, a work-clamp, and means for producing relative feeding movements between the stitch-forming mechanism and the work-clamp, of work-clamp operating means comprising a rock-lever provided with a rigid arm and a swinging arm adapted for movement laterally transversely of its rocking movements, a connection between the rock-lever and the work-clamp, actuating means including a clamp-closing and a clamp-opening tappet with means for imparting operative movements thereto, and means for shifting the swinging rock-lever arm out of operative relation with the clamp-opening tappet during the action of the clamp-closing tappet upon the rigid rock-lever arm, and for thereafter restoring said swinging arm to operative relation with the clamp-opening tappet.

24. In a buttonhole stitching machine, the combination with stitch-forming mechanism, a work-clamp, and means for producing relative feeding movements between the stitch-forming mechanism and the work-clamp, of work-clamp operating means comprising a rock-lever, a connection between the same and the work-clamp, a normally operative locking device for preventing the movement of said rock-lever, a clamp-closing and a clamp-opening tappet adapted for action successively upon said rock-lever and upon said locking device preparatory to each engagement with the rock-lever, means for imparting operative movements to said tappets, and controlling means for preventing the engagement of the clamp-opening tappet with the rock-lever when the clamp-closing tappet is in operative relation therewith.

25. In a buttonhole stitching machine, the combination with stitch-forming mechanism, a work-clamp, and means for producing relative feeding movements between the stitch-forming mechanism and the work-clamp, of work-clamp operating means comprising a rock-lever provided with a rigid arm and a swinging arm adapted for movement laterally transversely to its rocking movements, a connection between the rock-lever and the work-clamp, a normally operative locking element provided with a rigid shoulder and a laterally yielding shoulder movable transversely of the direction of rocking movement of the rock-lever, a clamp-closing tappet adapted for successive engagement with the rigid shoulder of the locking element and the rigid arm of the rock-lever for unlocking and shifting the rock-lever to close the clamp, a clamp-opening tappet adapted for successive engagement with the yielding shoulder of the locking element and the laterally swinging arm of the rock-lever for unlocking and shifting the rock-lever to open the clamp, means for actuating said tappets, and means for preventing the effective operation of the clamp-opening tappet while the clamp-closing tappet is in effective action.

26. In a buttonhole stitching machine, the combination with stitch-forming mechanism, slit-cutting mechanism, operating means for said slit-cutting mechanism, a work-clamp, means for producing relative feeding movements between the stitch-forming mechanism and the work-clamp, and adjusting means whereby the length of relative traverse of the work-clamp and stitch-forming mechanism may be varied, of automatically acting means independent of said operating means and unaffected by said adjusting means for closing and opening the clamp respectively at the beginning and end of a buttonhole-producing cycle.

27. In a buttonhole sewing machine, in combination, a work-clamp, clamp-opening means, a slit-cutting device, an actuator adapted for connection with the clamp-opening means and cutting device but having a range of action beyond which they are normally positioned and devices acting separately from each other for establishing operative connection of the clamp-opening means and the cutting device respectively with said actuator.

28. In a buttonhole sewing machine, in combination, stitch-forming and feeding mechanisms, a work-clamp, clamp-opening means, a slit-cutting device, an actuator operative independently of the stitch-forming and feeding mechanisms, and devices acting separately from each other for establishing operative connection of the clamp-opening means and the cutting device respectively with said actuator.

29. In a buttonhole sewing machine, in combination, stitch-forming mechanism, actuating means therefor, a work-clamp, clamp-opening means, a rotary actuator performing repeated excursions during a given buttonhole-producing cycle and operative independently of the stitch-forming mechanism and its actuating means, and means operating after the buttonhole has been stitched to establish and interrupt operative connection between said actuator and the clamp-opening means to effect the opening of the work-clamp at the close of said buttonhole producing cycle.

30. In a button hole sewing machine, in combination, stitch-forming mechanism, a shaft for actuating the same, a stop-motion for controlling its period of action, a work-clamp, clamp-opening means, an actuator operable independently of said shaft during the stitching period of a buttonhole producing cycle, and means controlled by the stop-motion for establishing operative connection between said actuator and the clamp-opening means whereby said actuator operates at the close of the buttonhole producing cycle to open the work-clamp.

31. In a buttonhole sewing machine, in combination, stitch-forming mechanism, a stop-motion for controlling its period of action, a work-clamp, means including a feed-wheel for relatively moving the stitch-forming mechanism and work-clamp in sewing about a buttonhole, clamp-opening means, an actuator, means controlled by the stop-motion for establishing operative connection distinct from the feed-wheel between said actuator and the clamp-opening means, whereby said actuator acts at the close of the buttonhole-producing cycle to open the work-clamp while the feed-wheel is stationary and means acting independently of the stop-motion for interrupting said connection.

32. In a buttonhole sewing machine, in combination, stitch-forming and feeding mechanisms, a work-clamp, clamp-opening and closing means, a slit-cutting device, operating means therefor independent of the stitch-forming and feeding mechanisms, and means for establishing operative connections between said operating means and the clamp-opening and closing means, respectively, at different times during a buttonhole producing cycle.

33. In a buttonhole sewing machine, in combination, stitch-forming and feeding mechanisms, a stop-motion for determining their period of coöperative action, a work-clamp, clamp-opening and closing means, slit-cutting mechanism, an operative connection between the clamp-closing means and the slit-cutting mechanism, and means controlled by the stop-motion in arresting the stitch-forming and feeding mechanisms during a given buttonhole producing cycle for establishing operative connection between the clamp-opening means and the slit cutting mechanism to effect the opening of the work-clamp at the close of said cycle.

34. In a buttonhole sewing machine, in combination, stitch-forming mechanism, a work-clamp, feeding mechanism for producing relative stitch-positioning movements between said stitch-forming mechanism and work-clamp, a main-shaft for said stitch-forming and feeding mechanisms, clamp-opening means, slit-cutting mechanism distinct from said stitch-forming and feeding mechanisms and their actuating shaft, and an operative connection between the slit-cutting mechanism and the clamp-opening means.

35. In a buttonhole sewing machine, in combination, stitch-forming mechanism, a work-clamp, feeding mechanism for producing relative stitch-positioning movements between said stitch-forming mechanism and work-clamp, a main-shaft for said stitch-forming and feeding mechanisms, clamp-opening means, slit-cutting mechanism distinct from said stitch-forming and feeding mechanisms and their actuating shaft, an actuator from which the clamp-opening means and cutting device are normally disconnected during the stitching, and means for establishing operative connection of the slit-cutting device and the clamp-opening means with said actuator.

36. In a buttonhole sewing machine, in combination, stitch-forming mechanism, a work-clamp, feeding mechanism for producing relative stitch-positioning movements between said stitch-forming mechanism and work-clamp, a main-shaft for said stitch-forming and feeding mechanisms, clamp-opening means, clamp-spreading means, slit-cutting mechanism distinct from said stitch-forming and feeding mechanisms and their actuating shaft, an actuator from which the cutting device and the clamp-opening and spreading means are normally disconnected, and means for establishing operative connection of said actuator with the cutting device and clamp-opening and spreading means for effecting the cutting of a buttonhole-slit and the opening and unspreading of the clamp.

37. In a buttonhole sewing machine, in combination, a work-clamp, spreading means therefor operating independently of the movement of the work-clamp, slit-cutting mechanism, an actuator therefor, and means adapted for operative connection with said actuator whereby the spreading means are reciprocally operated to effect the spreading and unspreading of the clamp.

38. In a buttonhole sewing machine, in combination, a work-clamp, spreading means therefor operating independently of the movement of the work-clamp, slit-cutting mechanism, and operative connections between the latter and the spreading means for effecting the spreading and unspreading of the work-clamp.

39. In a buttonhole sewing machine, in combination, a work-clamp, spreading means therefor operating independently of the movement of the work-clamp, slit-cutting mechanism, and an operative connection between the slit-cutting mechanism and the spreading means whereby the latter is operated to unspread the clamp.

40. A buttonhole sewing machine comprising in combination, stitch-forming mechanism, a work-clamp, means including a feed-wheel for producing relative traveling movements between said stitch-forming mechanism and work-clamp, power means running idly during the sewing, normally stationary clamp-opening means, and connections distinct from said feed-wheel for coupling the clamp-opening means with said power means.

41. In an automatic buttonhole sewing machine, in combination, stitch-forming mechanism, a stop-motion therefor, a rotary element adapted to act prior to the stitching operation and available to perform a desired operation preparatory to stitching, and a second rotary element stationary throughout the preparatory and stitching stages of a buttonhole-producing cycle and adapted to act subsequently to the stitching operation to perform a desired operation after stitching, said first mentioned rotary element being stationary during the stitching operation.

42. In an automatic buttonhole sewing machine, in combination, stitch-forming mechanism, a stop-motion therefor, a rotary element adapted to act prior to the stitching operation and available to perform a desired operation preparatory to stitching, a second rotary element stationary throughout the preparatory and stitching stages of a buttonhole-producing cycle and adapted to act subsequently to the stitching operation to perform a desired operation after stitching, means connected to said first-mentioned rotary element for operating the stop-mechanism to start the stitch-forming mechanism, and means connected to said stop-mechanism for starting said second rotary element after the stitching is completed, said first mentioned rotary element being stationary during the stitching operation.

43. In an automatic buttonhole sewing machine, in combination, stitch-forming mechanism, a stop-motion therefor, a rotary element adapted to act prior to the stitching operation and available to perform a desired operation preparatory to stitching, a second rotary element stationary throughout the preparatory and stitching stages of a buttonhole-producing cycle and adapted to act subsequently to the stitching operation to perform a desired operation after stitching, manually controlled means for initiating the action of said first rotary element, and automatically acting means controlled by said first rotary element for initiating the action of said second rotary element, said first mentioned rotary element being stationary during the stitching operation.

44. In an automatic buttonhole sewing machine, in combination, stitch-forming mechanism, a stop-motion therefor, a rotary element adapted to act prior to the stitching operation and available to perform a desired operation preparatory to stitching, a second rotary element stationary throughout the preparatory and stitching stages of a buttonhole-producing cycle and adapted to act subsequently to the stitching operation to perform a desired operation after stitching, and driving means for said rotary elements including constantly running drivers and means for establishing and automatically interrupting driving relation between said drivers and said rotary elements, said first mentioned rotary element being stationary during the stitching operation.

45. In an automatic buttonhole sewing machine, in combination, stitch-forming mechanism, a stop-motion therefor, a rotary element adapted to act prior to the stitching operation and available to perform a desired operation preparatory to stitching, a second rotary element stationary throughout the preparatory and stitching stages of a buttonhole producing cycle and adapted to act subsequently to the stitching operation to perform a desired operation after stitching, and driving means for said rotary elements including constantly running drivers and automatic throw-out clutch devices between said drivers and said rotary elements, whereby each of said rotary elements will, upon the completion of a predetermined angle of rotation be automatically disconnected from its driver.

THE SINGER MANUFACTURING COMPANY,
*Assignee of the entire interest of James G. Greene and Louis F. A. Büchner.*
By F. A. PARK,
*Vice President.*
JAMES G. GREENE.

Copies of this patent may be obtained for five cents each, by addressing the "Commissioner of Patents, Washington, D. C."